Patented Nov. 26, 1935

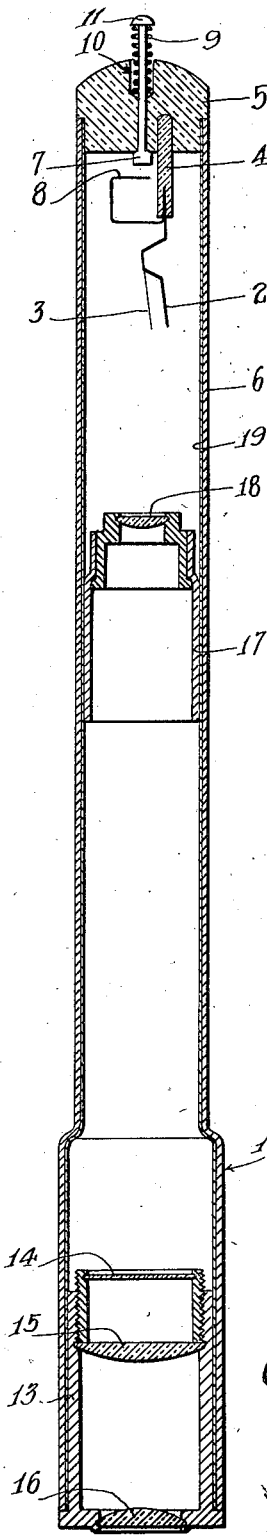

2,022,117

UNITED STATES PATENT OFFICE 2,022,117

ROENTGEN METER

Charles C. Lauritsen, Pasadena, Calif., assignor to California Institute of Technology, Pasadena, Calif., an educational corporation of California Application January 3, 1933, Serial No. 649,795

9 Claims. (Cl. 250—34)

This invention relates to a Roentgen meter and refers particularly to a device for making measurements of X-ray intensity.

It is the general object of the present invention to provide an electroscope which can be made in pocket size for use by operators of X-ray apparatus to enable the operators to measure readily and at all times the intensity of a beam of radiation or around the apparatus.

The X-ray dose is measured in Roentgen units, the Roentgen being defined by international agreement as the quantity of X-rays which produces by ionization one electrostatic unit of charge in air under standard conditions. X-ray intensity is measured in Roentgens per unit of time.

A device suitable for measuring X-ray intensity directly in terms of this unit is known as an open or free air chamber. Such a device, however, is large and somewhat inconvenient to use. For this reason, it is common practice to make routine measurements with a more convenient device, which is calibrated against the open air chamber.

One of the most frequently used devices of this sort is a so-called thimble chamber, which consists of a small ionization chamber connected to an electroscope. It is used in a variety of forms and several types are on the market. None of them, however, can be said to be truly portable, for the electroscope is usually a somewhat delicate instrument which must be handled with a great deal of care and must be carefully set up and adjusted to use. Even more difficult is the connection between the ion chamber and the electroscope, for the electric charge to be measured is quite small, so that any leakage of charge or change in capacity may seriously influence the accuracy of the instrument.

The art heretofore has disclosed no device which is entirely satisfactory, and all are rather expensive to manufacture and complicated to use for routine work. For this reason, these measuring devices are not used nearly as widely as they should be, although it is important that repeated measurements be taken, especially in therapeutic work.

It is the general object of the present invention to provide an apparatus which will eliminate the difficulties before mentioned.

More particularly, it is the general object of the present invention to provide an apparatus which includes an ion chamber and an electroscope built together within a small tube, thereby avoiding the use of a connecting cable. This has been accomplished by the use of an electroscope of somewhat novel design.

More particularly, in accordance with the present invention, there is employed an electroscope similar in principle to the well-known gold leaf electroscope, but in place of the gold leaf a fine gold covered quartz fibre is used. This fibre is connected to the insulated terminal of the ion chamber. Its position can be read on a graduated scale in the eyepiece of a microscope. In a preferred form the microscope, ion chamber and electroscope are all contained within a tube about the size of a fountain pen.

The present invention, together with various objects and advantages thereof, will best be understood from a description of a preferred form or example of an apparatus embodying the invention. For this purpose, I have hereinafter described, with reference to the accompanying drawing, one form or example of a Roentgen meter embodying this invention.

In the drawing:

The figure is an elevation in vertical section.

The apparatus may be constructed for a wide range of intensities. In the most sensitive type the electrostatic capacity is made as small as practical. In this preferred type, as illustrated in the accompanying drawing, the electroscope consists of a fine wire 2, on which the gold covered quartz fibre 3 is mounted. As illustrated, the wire 2 is preferably bent so that it has its free end spaced normally slightly from the free end of the quartz fibre 3. The quartz fibre may be made about 3 m$\mu$ in diameter and 3 mm. long. The electroscope is supported on the end of a small rod 4, which is preferably of amber, which rod 4, in turn, is mounted in a plug of transparent insulating material, such as bakelite 5. The plug 5 forms one end of a chamber and serves as a condensing lens or window for illuminating the quartz fibre 3. The chamber is preferably made of tubing, for example of aluminum 6, which may be made one-half inch or less in diameter. The plug 5 is provided with a bore, through which is a spring-actuated contact 7 which is longitudinally movable in the bore in order to contact with an end 8 of the wire 2. The contact 7 is normally held in a retracted position by a spring 9 mounted in a socket 10 in the plug 5 and engaging a head 11 on the contact 7.

The electroscope may be charged by the simple process of pressing the charging switch or head 11 thereof against one terminal of a battery or other suitable source of potential, while the opposite terminal of the battery is connected to the housing 6 of the ion chamber.

The ion chamber is expanded, as indicated at 12, near one end to accommodate the eyepiece 13 of a microscope, which microscope is provided with a scale 14 and with lenses 15 and 16. The housing of the electroscope also receives a tube 17 carrying an objective 18 for focusing the electroscope upon the scale 14 of the eyepiece 13. The objective 18 forms an air-tight closure for the space between the objective and the electroscope, so that this space constitutes the ion chamber proper. In order to minimize the wall effect, the inner wall of the aluminum tubing 6 is preferably lined with paper dipped in ink, as indicated at 19.

The type of apparatus thus particularly described merely is one example of the invention having a sensitivity which is fairly uniform over most of the scale, being about 0.002 Roentgen per scale division, and is, therefore, suitable for measuring the stray radiation around an X-ray installation or in a place where radium is handled. The apparatus is of extreme value to the workers around such emanations, as it can be conveniently carried around in a pocket of an operator and used continuously for the measurement of stray radiations, and will insure the operator complete safety against accidental over-dosage of these radiations. The daily dose to which a person may be safely exposed is generally taken to be about 0.2 Roentgen. Half of this amount would give fifty scale divisions in the apparatus particularly described. An operator of an X-ray installation with the apparatus herein described may arrange the protection against stray radiations so that the electroscope carried by the person will not be completely discharged in one day. In such a case, he will be insured from over-dosage of radiation.

For the purpose of measuring more intense radiation, as for instance the output of an X-ray tube or for depth dose measurements, the ion chamber may be modified so that it consists of two or more cylindrical sleeves arranged to form a condenser of suitable capacity to give deflection in say one minute. To make a measurement the electroscope is first charged to about 200 volts, as described above, and the position of the fibre noted. The instrument is then held for one minute with its lower end in the X-ray beam at the point where it is desired to measure the intensity. The position of the fibre is again read. The difference between the two readings gives the intensity directly if the scale is calibrated in Roentgens per minute, or the intensity is obtained from a calibration chart if an arbitrary scale is used.

For making measurements within body cavities, it is convenient to calibrate the instrument with some sort of protecting sleeve. An ordinary glass test tube is suitable to protect the sleeve. The instrument when calibrated may be placed in a test tube and inserted in the body cavities and held in place with adhesive tape to prevent displacement during the measurement.

While the particular form of electroscope herein described is well adapted to carry out the objects of the invention, it is to be understood that various modifications and changes may be made, all without departing from the principles of this invention, and this invention includes all such modifications and changes as come within the scope of the appended claims.

I claim:

1. A Roentgen meter, comprising a tube having a plug at one end supporting an electroscope having a coated quartz fibre, an objective in the central part of the tube and sealing the body and together with the plug and portion of the body supporting the electroscope providing an ion chamber, and an eyepiece at the opposite end of said tube from the plug providing a self-contained microscope for the apparatus.

2. An ionization chamber containing an indicating device mounted on a transparent plug or window suitable for illuminating the indicating device.

3. A Roentgen meter, comprising a tube having a plug at one end carrying an electroscope, an objective in the central part of the tube and sealing off the portion of the body enclosing the electroscope so as to provide the body with an ion chamber, and an eye-piece at the opposite end of said tube from the plug providing a self-contained microscope for the apparatus.

4. A Roentgen meter, comprising a tube having a plug at one end carrying an electroscope, an objective in the central part of the tube and sealing off the portion of the body enclosing the electroscope so as to provide the body with an ion chamber, an eye-piece at the opposite end of said tube from the plug providing a self-contained microscope for the apparatus, and a scale interposed between said objective and eye-piece.

5. A Roentgen meter, comprising a tube body having a transparent plug at one end supporting an electroscope, an objective in the central part of the tube sealing off one end of the body which encloses the electroscope to provide an ion chamber, and an eye-piece at the opposite end of said tube from the plug providing a microscope.

6. A Roentgen meter, including a tube having a plug at one end carrying an electroscope, an objective sealing off said end of the tube to provide an ion chamber for said electroscope, and a scale at the other end of said tube on which the electroscope is focused by said objective.

7. A Roentgen meter, including a tube having a plug at one end carrying an electroscope, an objective sealing off said end of the tube to provide an ion chamber for said electroscope, a scale at the other end of said tube on which the electroscope is focused by said objective, and a magnifying eye-piece enclosed in said tube.

8. A Roentgen meter, consisting of a tube of metal having a transparent plug at one end carrying an electroscope, an objective in the central portion of the tube dividing the end having the electroscope into an ion chamber, and a dark lining for said tube.

9. A Roentgen meter, consisting of a tube of metal having a transparent plug at one end carrying an electroscope, an objective in the central portion of the tube dividing the end having the electroscope into an ion chamber, a dark lining for said tube, and a scale at the opposite end of said tube from said electroscope.

CHARLES C. LAURITSEN.